UNITED STATES PATENT OFFICE.

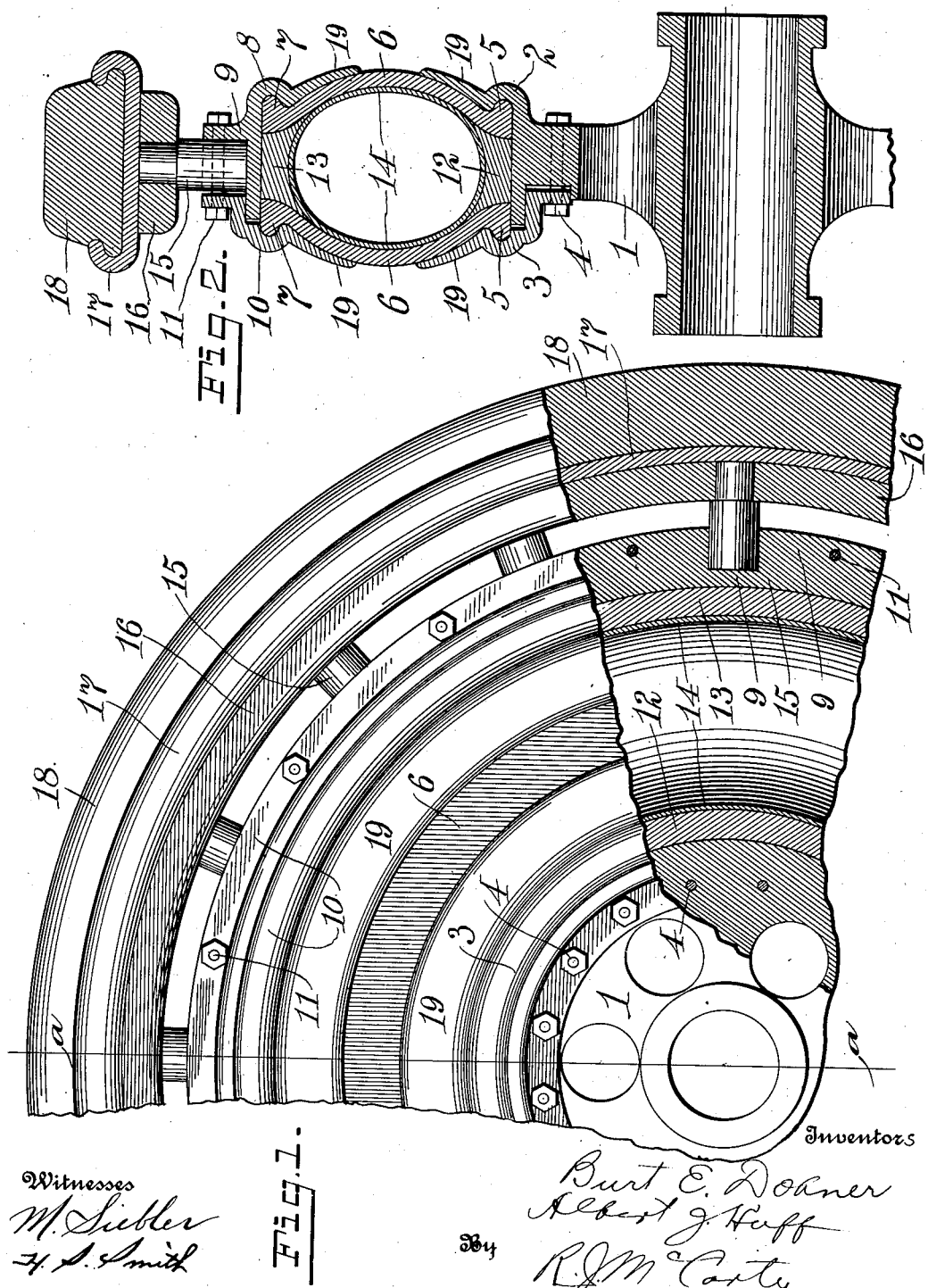

BURT E. DOHNER AND ALBERT J. HUFF, OF DAYTON, OHIO.

VEHICLE-WHEEL.

1,011,332.   Specification of Letters Patent.   Patented Dec. 12, 1911.

Application filed October 24, 1910. Serial No. 588,626.

*To all whom it may concern:*

Be it known that we, BURT E. DOHNER and ALBERT J. HUFF, citizens of the United States, residing at Dayton, in the county of Montgomery and State of Ohio, have invented certain new and useful Improvements in Vehicle-Wheels; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in vehicle wheels, especially the wheels of motor vehicles.

The objects of the invention are to preserve the resiliency of the wheel due to the pneumatic tire, and remove the tire from the felly or outer circumference of the wheel. This is accomplished through the instrumentality of the devices hereinafter described and claimed.

Figure 1 is a portion of an automobile wheel constructed in accordance with our invention, the same being partially in section. Fig. 2 is a sectional view on the line *a—a* of Fig. 1.

In the drawings and specification, similar reference characters indicate corresponding parts.

Referring in detail to the said drawings, 1 designates the hub of the wheel, which is provided with an integral clencher portion 2 and a removable clencher portion 3, both of which portions constitute the inner clencher rim of the wheel. The removable portion 3 of said clencher rim is secured in position by a suitable number of bolts 4. This inner clencher rim thus formed by the parts 2 and 3, receives the inner circumference of the outer casing 6, which incloses the inflatable tire 14. The portion of the outer casing received and secured by said inner clencher rim, is enlarged and extended laterally, as at 5, to enter a corresponding groove in said rim, while the extended portion 19 of said inner clencher rim lies up against the outer adjacent sides of the casing 6 and provides a circumferential support for said casing. It will be observed that the outer casing 6 is constructed of two side members, and these are provided with outer circumferential enlargements 7 similar to the enlargements 5. These outer enlargements 7 are embraced by an outer clencher rim consisting of two portions 8 and 10, the flanged portions 9 of which are separated to receive a series of short spokes 15, and said flanged portions 9 are united at points between the spokes by a series of bolts 11. Like the inner clencher rim, this outer clencher rim has the same extensions 19, which extend over the outer circumferential surface of the pneumatic casing 6 and securely support the outer circumference of said casing in a manner similar to the extensions 19 of the inner clencher rim. The portions of the casing 6 thus lying within the clencher rims, are separated by annular portions or rings 12 and 13 which provide inner rigid portions that combine with the adjacent parts of the clencher rims, to hold the outer casing securely in position under all conditions of wear. It will be observed that these inner holding members 12 and 13, flare inwardly and have a shape which conforms to the inner surfaces of the enlarged portions 5 and 7 of said outer casing, and they thus coöperate with the clencher rims in providing a most efficient retaining means for the outer casing. The inner circumferences of these holding rings 12 and 13 are also suitably shaped to conform to the contour of the inner pneumatic tire 14 when the latter is inflated. The outer circumferences of said holding members abut against the annularly extended portions of the clencher rims, so that it will be seen that said holding members are housed on all sides. Lying outwardly from the member 9 of the outer clencher rim, is a suitable number of short spokes 15 before referred to and which are provided with tenons which enter sockets in the felly 16, and by means of which said felly is rigidly secured to the outer clencher rim. The spokes 15 and felly 16 are held securely in position by being clamped between the members of the outer clencher rim. The felly 16 is united to an outermost rim 17, the circumferential edges of which are turned inwardly to clench the adjacent matching surfaces of a solid tire 18.

It will be apparent that the extended flanges 19 of the clencher rims, are instrumental in distributing the shocks through the pneumatic tire or portion of the wheel in striking obstructions or the like, and it is also apparent that in the case of a blow-out or severe puncture at any point in the tire, the wheel cannot collapse, owing to the inner and outer circumference of the outer casing being securely held by the means described. The circumferential edges of the flanges 19 lie sufficiently apart to prevent their engaging or coming in contact when the wheel is riding over unusually rough ground.

It will be noted that the pneumatic portion or casing 6 forms the driving connection between the inner and outer portions of the wheel; consequently the wheel in its entirety will be very resilient.

We claim:

1. In a vehicle wheel, the combination with a hub, and a two-part tire casing, of inner and outer retaining rings inclosed between the inner and outer circumferential portions of said casing, an inflatable tire inclosed by said casing and retaining rings, inner and outer clencher rims each consisting of two clamping members with extended circumferential portions which embrace the opposite sides of the casing for a substantial distance, and whereby lateral strain is more equally distributed to the wheel structure as a whole, said clencher rims clamping the inner and outer circumferences of the casing to the retaining rings, and bolts uniting the members of said clencher rims, substantially as described.

2. In a vehicle wheel, the combination of a hub, a two-part tire casing, inner and outer retaining rings inclosed by the inner and outer circumferential portions of said casing, an inflatable tire inclosed by said casing and retaining rings, an inner clencher rim consisting of two members united to the hub and clamping the inner circumference of the tire casing against the inner retaining ring, said inner clencher rim being extended to embrace substantial portions of the opposite sides of the tire casing, an outer clencher rim consisting of two members clamping the outer circumference of the tire casing against the outer retaining ring, said outer clencher rim being extended to embrace substantial portions of the opposite sides of the tire casing, a felly, spokes projecting from said felly between outer circumferential portions of said outer clencher rim, and a series of bolts uniting the two members of said outer clencher rim, whereby said spokes are clamped by said clencher rim, substantially as shown and described.

In testimony whereof we affix our signatures, in presence of two witnesses.

BURT E. DOHNER.
ALBERT J. HUFF.

Witnesses:
R. J. McCarty,
Howard S. Smith.